Dec. 5, 1972    F. L. ROGERS ET AL    3,705,222
METHOD OF CASTING FOAM PLASTIC TO JOIN A RIGID
SHELL AND THIN POLYMERIC SKIN
Filed Sept. 19, 1969    3 Sheets-Sheet 1

Inventors
Frederic L. Rogers
William W. Rogers
By Cushman, Darby & Cushman
Attorneys

United States Patent Office 3,705,222
Patented Dec. 5, 1972

3,705,222
METHOD OF CASTING FOAM PLASTIC TO JOIN A RIGID SHELL AND THIN POLYMERIC SKIN
Frederic L. Rogers, Saint John, New Brunswick, Canada, and William W. Rogers, deceased, late of Saint John, New Brunswick, Canada, by Sarah M. Rogers, executrix, P.O. Box 2061, Station C, Saint John, New Brunswick, Canada
Continuation-in-part of application Ser. No. 499,191, Oct. 21, 1965. This application Sept. 19, 1969, Ser. No. 864,569
Int. Cl. B29d 27/04
U.S. Cl. 264—45
18 Claims

ABSTRACT OF THE DISCLOSURE

A moulding process for producing an article including a cellular body having a thin protective plastic skin adhering to a first portion of the body surface with a preformed relatively hard protective shell adhering to substantially all of the remaining body surface. In the described process the cellular body is moulded while at the same time said plastic skin and said preformed shell are simultaneously bonded thereto with said preformed shell acting to contain and mould a portion of the cellular body during the molding operation. The protective skin and the shell structure are applied relative to the cellular body such that a relatively narrow band of the cellular material of said body separates the skin from contact with said shell thereby improving the insulating properties of the insulating article thus formed.

---

This is a continuation-in-part of co-pending application Ser. No. 499,191 filed Oct. 21, 1965 and now abandoned in the names of Frederic L. Rogers and Wendell W. Rogers (now deceased).

This invention relates in general to a process for moulding an insulating article, and more particularly to a process of moulding a portion of an insulating body having a pair of opposed surfaces thereon exhibiting different characteristics. The process of the invention is used to produce a moulded insulating article including an insulating body having a pair of opposed surfaces thereon exhibiting different characteristics.

It is well known to form articles from cell forming moulding materials such as polystyrene and polyurethane, the articles moulded therefrom possessing excellent insulating properties. The surfaces of such articles, however, are very tender and frangible and are often insufficiently attractive for many uses. As a result, much effort has been made in the past to overcome the above drawbacks to these insulating materials. Many patents have issued relating to this problem, for example U.S. Pat. 2,950,505 issued Aug. 30, 1960 to J. Frank and which describes a process wherein an article having a cellular body of the type indicated above and having a protective skin bonded thereto is formed by a single moulding operation which serves to develop and mould a cellular body of expanded polystyrene while simultaneously developing and moulding the skin and causing it to adhere to the cellular body.

In certain applications a moulded cellular body may be required to have surfaces thereon exhibiting differing properties. For example, one surface of the cellular body may be exposed to heavy impact and abrasion, while a second surface may be exposed to moisture, for example, and only very little, if any impact and abrasion. The present invention provides a process for moulding a foamed or cellular body having a protective, light weight plastic skin bonded to a first surface of said body and a second surface of said body having an impact resistant shell bonded thereto.

The object of the invention is to provide a process of moulding a cellular insulating body with a protective skin bonded to a first surface thereof and a protective shell bonded to substantially all the remaining surface area of said body, said process characterized in that said protective skin and said protective shell are selectively applied relative to said cellular body such that a relatively narrow band of said cellular insulating material separates said skin from contact with said shell thereby reducing heat transfer from said skin to said shell.

Accordingly, the present invention provides a moulding process including the steps of selectively coating a mould with a thin skin of non-expansible synthetic, thermoplastic material so as to produce coated and uncoated areas on said mould. A preformed shell structure shaped to provide an enclosure between itself and the coated surface of the mould is positioned over the coated area of the mould and a quantity of uncured foam forming synthetic plastics material is confined within the enclosure formed between the coated area of the mould and the preformed shell structure. The preformed shell structure is positioned relative to said mould such that a peripheral edge of the shell structure contacts the mould along a line of contact which completely surrounds the coated area of the mould, with the line of contact being spaced from the coated area. The foam forming materials are maintained at a temperature sufficient to cause expansion and curing thereof and the foam forming materials are allowed to expand and fill said enclosure and to come into contact with the thin plastic skin and the interior portion of the shell structure. The expanded foam material is retained within the enclosure for a period of time sufficient to allow the material to cure and harden and form a bond with the thin plastic skin and the preformed shell structure by virtue of said contact, thereby to form an insulating component with the thin plastic skin forming a first surface portion thereof and the preformed shell structure forming substantially all of the remaining surface thereof. The mould is thereafter separated from the insulating component. The insulating component produced by the process is characterized in that a band of the cured foam material separates the preformed shell from the plastic skin.

Further objects and aspects of the invention will become apparent as the description of an embodiment of the invention proceeds.

The invention is illustrated by way of example in the accompanying drawings in which.

Figure 1:
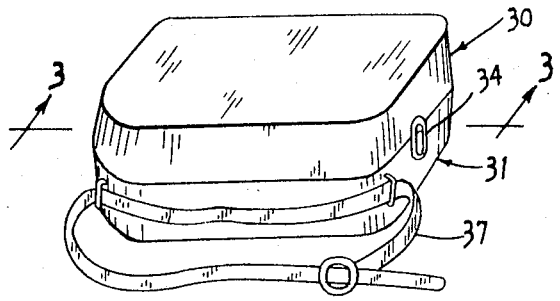
FIG. 1 is a perspective view of an embodiment of a heat insulating kit.
Figure 4:
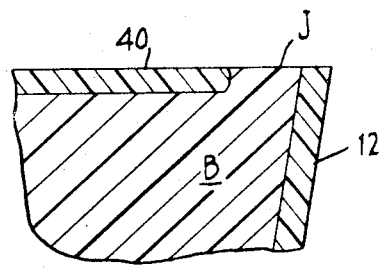
FIG. 4 is a magnified view in cross section of a portion of the insulating kit.
Figure 2:
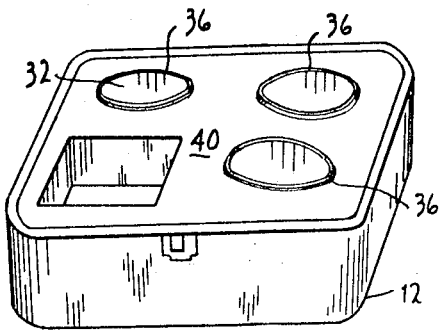
FIG. 2 is a perspective view of the separated components of the insulating kit.
Figure 2:
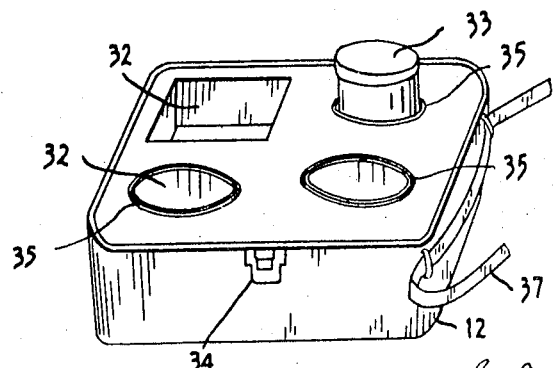

The insulating kit illustrated in FIGS. 1, 2 and 4 comprises an upper insulating component 30 and a lower insulating component 31. The components 30 and 31 each have therein a plurality of compartments 32. Each of the compartments 32 in component 31 is adapted to receive a selected hot or cold food container 33, one of which is shown in FIG. 2. The compartments 32 in component 30 complement the compartments 32 in component 31 when the two components are operatively connected together. When container 33 are installed in compartments 32 in component 31, the two components are operatively connected together by placing component 30 on top of component 31 in face-to-face relationship so that the containers 33 are enclosed within the kit. The two components 30 and 31 are then detachably connected together by clamps 34 of which only one is shown in the drawings.

Each component 30, 31 includes a cellular insulating body portion B for which purpose polyurethane foam has been found to be very suitable. The surface of insulating body B container compartments 32 has a relatively thin plastic skin 40 bonded thereon which protects cellular body B from the penetration of moisture and food odours thereinto, and further serves to increase the strength of said surface and improve the appearance thereof. Substantially the whole of the remaining surface of cellular insulating body B has secured thereto a hard protective shell 12 which effectively encloses the sides of insulating body B and the surface thereof opposite to the compartmentalized surface bearing plastic skin 40. Shell 12 provides an impact resistant, long wearing, dimensionally stable protective cover for the delicate cellular insulating body B.

Figure 3:
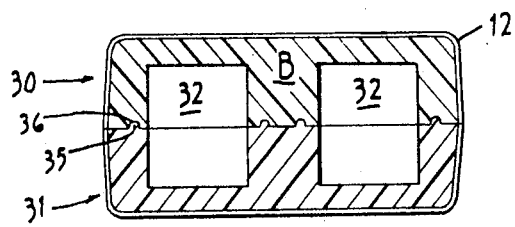
FIG. 3 is an elevation view in cross section of the insulating kit taken along line 3—3 of FIG. 1.

As shown in FIGS. 2 and 3 raised ridge 35 forms the upper peripheral edge of each compartment 32 and each ridge 35 is adapted for insertion in a corresponding recess 36 formed in component 30, whereby a heat transfer barrier is formed around each compartment 32 in the region where components 30 and 31 meet in fact-to-face relationship when components 30 and 31 are operatively connected together.

As shown in FIG. 4 the thin plastic skin 40 does not reach to the edge of protective shell 12, but rather a relatively narrow band J of the cellular insulating material B is exposed around the edge of shell 12. This construction is preferable since a skin which goes right to the edge of the shell tends to lift and pull away from the cellular insulating body B under rough service conditions. Further, the presence of the narrow insulating band J greatly reduces the amount of heat transferred to and from compartment 32 to the protective shell 12.

In the illustrated embodiments an adjustable shoulder strap 37 is secured to component 31 thereby enabling the kit to be readily carried from one place to another. It will be readily apparent that the kit is suited to the carrying of cold desserts such as ice cream along with hot items without any substantial temperature changes in either for reasonable periods of time provided the foods are segregated by their respective compartments.

Several pieces of equipment are used in the process and these will be described in connection with the process step in which they find particular use.

Figure 5:
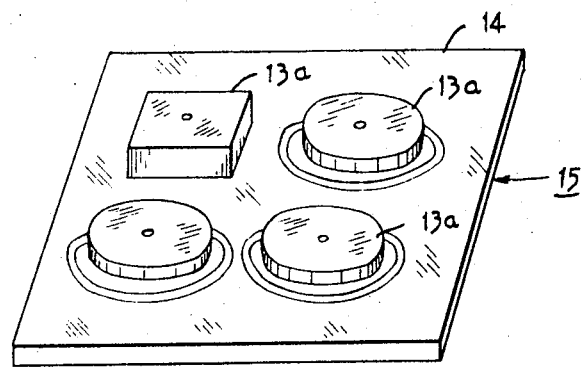
FIG. 5 illustrates one form of a mould for making the insulating lunch kit according to the method of the invention.

In FIG. 5 there is shown a mould 15 which comprises a flat plate 14 having attached thereto a plurality of hollow bosses 13A. The size, shape and number of bosses selected depend upon the number and configuration of compartments 32 desired in the insulating kit referred to earlier. The mould surfaces are given a high polish before assembly, so as to impart a high gloss to the surface of the article moulded thereby and to reduce friction and allow relatively easy separation of the article from the mould. Mould 15 is also provided with grooves or recesses corresponding to grooves and ridges 35, 36 in components 30 and 31 respectively. Therefore the mould required for component 30 differs only from the mould required to make component 31 in respect of the grooves and ridges referred to. The exact dimensions of the mould may vary as will be evident to those skilled in the art. By way of example, die cast aluminum bosses having ¼" wall thickness having sides with a slight taper thereto fastened to a ⅜" flat aluminum plate have been found to be satisfactory. In general, the mould should be of sufficient thickness (a) so as not to bend and distort under later jigging pressures (b) to retain heat for a period of time sufficient to plasticize a vinyl skin disposed thereon at a later stage in the process and to maintain heat during a foam curing step in a later stage of the process.

Figure 10:
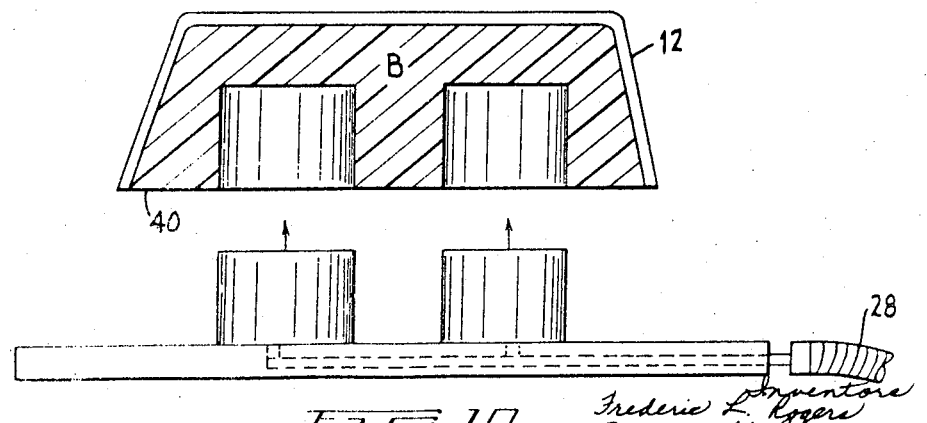
FIG. 10 illustrates the step of separating the moulded half of the lunch kit from the mould.

Aluminum is one of the few materials to which the polyurethane foam and vinyl do not easily adhere and is hence the preferred material for the mould. Mould 15 is further characterized in that a plurality of ports 24 are provided in the bosses 13a extending into the hollow interior of the latter. A series of passages drilled in the backing plate 14 interconnect the interiors of the bosses 13a. Pressurized air may be admitted to said passages and the hollow interior of bosses 13a as shown in FIG. 10, to dislodge a completed article from the mould.

Mound 15 is treated with a release agent which facilitates removal of the finished article therefrom at the end of the process. A number of materials are available on the market, a well known material being Dow Corning silicone release known as DC 200 which will withstand 400° F. temperature called for by the process. The preferred treatment of the mould is to apply a sintered Teflon (Registered Trademark) coating which acts as the release agent to give a clean and easy release of the product from the mould.

After treating the mould 15 with a suitable release agent, the mould is heated in a suitable manner and placed in an oven to stabilize its temperature at about 400° F. (alternatively the release agent may be applied after heating).

Figure 6:
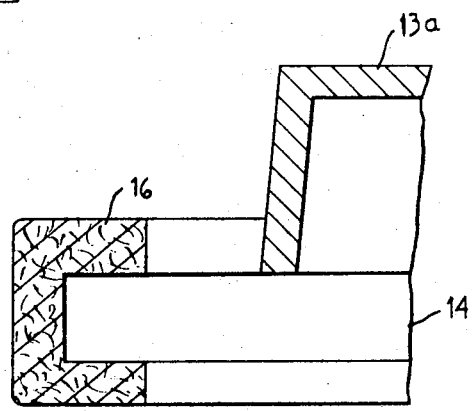
FIG. 6 illustrates a cross-section of a masking applied to a portion of the mould surface prior to coating the mould.

The heated mould 15 is then withdrawn from the oven and a mask 16 (shown in FIG. 6) made from a material having low heat transfer characteristics such as asbestos is placed completely around the periphery of the mould 15 so as to mask off a certain area thereof. For reasons which will be apparent later, it is necessary to mask inwardly of the peripheral edge of the mould. The masking operation is carried out quickly such that the temperature of the mould is maintained substantially constant prior to a coating operation.

Figure 7:
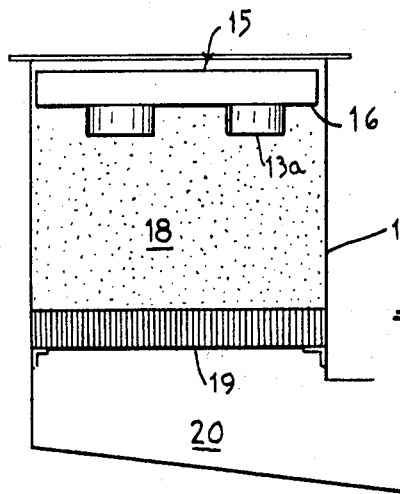
FIG. 7 illustrates the step of coating the mould surface by a fluidized bed process.

Mould 15 is then placed in a fluidized bed apparatus as illustrated schematically in FIG. 7. The fluidized bed consists basically of an upright chamber 17 having therein a porous ceramic plate 19 through which air under low pressure from a chamber 20 passes. A finely divided plastic powder 18 on plate 19 on the opposite side of chamber 20 is kept in a state of constant agitation by the passing air and powder particles striking the unmasked exposed portions of the heated mould are melted thereby, thus gradually building up a continuous layer or skin of plastic on the side of the mould having bosses 13a. The fluidized bed and materials used therein are described in U.S. Pats. 2,844,489; 2,974,059; 2,974,060; 2,981,631; 2,987,413. Flexible polyvinyl chloride has been found to be the best all-round material for forming the skin of plastic; however many other materials can also be used and these will be referred to later on in this specification.

The mask 16 is constructed such that it picks up very little heat from mould 15, and is not coated while in the fluidized bed and hence leaves a clean line of demarcation between coated and uncoated portions of the mould.

The coated mould 15 is then removed from the fluidized bed, the mask 16 is removed therefrom, and the mould 15 is cooled quickly from about 400° F. down to approximately 110° F. either by immersing the mould 15 in a water bath having a controlled temperature or by spraying the mould with water. Since pungent fumes are given off by the coated mould prior to immersion it is desirable to have the operating area well ventilated. The cooling step is necessary when using polyurethane foam in a subsequent foaming operation to achieve proper results, since polyurethane foam generally is cured at temperatures less than 135° F.

Figure 8:
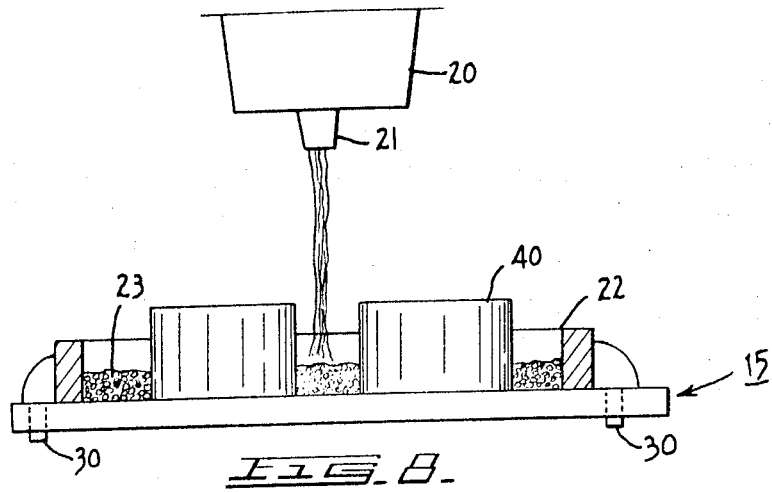
FIG. 8 illustrates the step of depositing the urethane mixture from a mixing chamber on the mould surface.

Coated mould 15 is then placed in another oven which maintains the temperature thereof constant. Mould 15 is removed from the oven just prior to the commencement of the foaming operation. The foaming operation, shown schematically in FIG. 8, is one in which the mould 15 bearing the coated vinyl surface is placed under a dispensing stream of mixed liquid chemical materials. These materials are dispensed by a standard machine common in the polyurethane foam industry made by Decker Mfg. Co. of Stuart, Fla. The materials are mixed by a high speed agitator in a blending chamber 20 and exit via a nozzle 21 under the influence of compressed air and are deposited on the coated surface of mould 15. During the first few seconds after exit from blending chamber 20 the materials appear as a slightly viscous liquid 23. In order that these liquid materials do not run off mould 15 it is necessary to place a retaining ring 22 around the mould 15 and its bosses 13a. The ring 22 is preferably of a heavy metal having about the same outline shape as the coated portion of the mould and defines an area somewhat greater than the area of the coated portion. Ring 22 as will be apparent as the description proceeds should be fastened to mould 15 in the same position each time with respect to bosses 13 and the specially demarked polyvinyl skin and it is hence preferable to provide the ring with a pair of positioning pins 30 which fit into corresponding holes in the mould plate 14 as shown in FIG. 8.

The rigid and flexible polyurethane foams are preferred because of their heat resistance in low density formulations and also because of their low heat transfer characteristics. These materials are formulated from combinations of polyester and polyether resins in combination with toluene diisocyanates. One suitable polyurethane foam formulation is made by Napco Chem. Co. of Newark, N.J., U.S.A. and is known as H-404 416, density rigid type. This material produces a pure white foam and has a curing time of about 20 minutes. Other types of material are available with shorter cure periods, as for example, a foam compound manufactured by the Carwin Co. of North Haven, Conn., U.S.A. having a cure time of about 5 minutes. Another foam formulation known as a PAPI foam can be moulded near room temperature hence necessitating cooling of the mould as described beforehand. There are also some rigid urethane foam systems coming into use which use a corn starch base as part of the polyether resin component. These materials would also appear to be satisfactory for use in the present process.

As is well known in the art foams should incorporate blowing agents, emulsifying agents and silicone surfactants for control of cell size and formation. The method, where liquid components are used in one shot or prepolymer urethane foam systems, also allows the use of reinforcing glass nodules or small hollow glass beads such as supplied by Corning Glass for internal strengthening of the foam. These nodules can be added to the mould in preparation for foaming or introduced during introduction of liquid components from the mixing nozzle or after the foam has started to rise, depending on the strength requirements. Foam formulations other than polyurethane may also be used and reference to some of these will be made hereinafter.

About 10 seconds after the liquid foam materials are placed on mould 15, the foaming action takes place and a protective shell 12 is placed over the mould 15 within the confines of retaining ring 22. Ring 22 ensures that protective shell 12 is always in a constant position with respect to bosses 13a and the line of demarcation between coated and uncoated portions of the mould. The peripheral edge of the shell 12 makes contact with the mould 15 along a line which is preferably at a substantially uniform distance from the line of demarcation between the coated and uncoated portions of the mould with the line completely surrounding the coated portion. The masking operation referred to earlier is therefore carried out such that the mould is selectively coated in accordance with the shape and dimensions of the edge of the latter positioned protective shell 12. A special wax is applied to the edge of protective shell 12 prior to placement in the ring. This wax aids in removal of a polyurethane foam flash which tends to develop during the moulding operation. A suitable release wax is made by Farbwerke Hoechst of Darmstadt, West Germany. The protective shell 12 may be heated to about 140° F. prior to placement on the mould. This alternative enchances the foaming action and the curing rate.

Protective shell 12 performs two important functions in that it (a) encloses the foaming materials and acts in the manner of a mould and (b) ultimately forms the exterior surface of the completed article. Protective shell 12 may be made of almost any material provided that it is light, strong, dimensionally stable and rigid, and is capable of being economically fabricated and will form a strong bond with the foam material. Suitable shell materials of polyester glass reinforced construction may be moulded from a pre-mix material in a compression type mould. One of the most suitable pre-mix materials is that made by B.I.P. Plastics in Birmingham, England type "G" or general purpose type. Other suitable shell forming materials will be referred to hereinafter.

It is highly preferable to deposit the polyurethane foam materials on the coated mould 15 as explained above and thereafter placing protective shell 12 on top of the mould so as to form and enclose the foaming materials. Although the reverse procedure is possible, i.e., pouring the foam materials first into the protective shell 12 and using the coated mould 15 to enclose the foaming action, it has been found that the latter procedure results in the formation of large bubbles (due to the difficulty in properly venting the cavity between shell 12 and mould 15) which spoil the insulating value of the foam. When using the preferred procedure, trapped gases are vented from shell 12 by drilling a plurality of tiny (approximately 1/16" diameter) holes 25 in the shell. The pattern in which the holes are drilled depends upon the mould configuration, but after a few trials, those skilled in the art will be readily able to predict where bubbles are apt to form and to compensate therefor.

Figure 9:
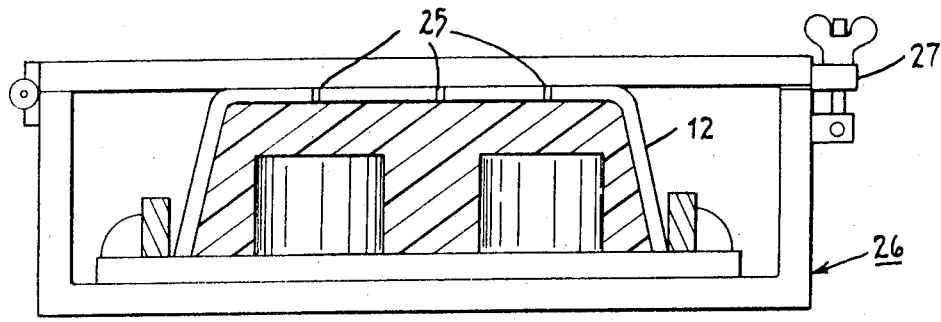
FIG. 9 illustrates the mould having a shell applied thereto, with the mould and shell held in clamped relationship in a jig assembly.

As soon as the foam starts to expand it is necessary that shell 12, which has been placed on mould 15 be kept in constant position, in contact with backing plate 14 of the mould 15. To maintain the shell in the proper transverse position, the entire assembly including shell 12, mould 15 retaining ring 22 with the foaming materials contained in the enclosure formed by said assembly is placed in a jig unit 26 shown schematically at FIG. 9. The jig unit 26 including clamping means 27 acts to hold shell 12 securely to the surface of mould 15 thus restraining the expansive forces of the foam and ensuring that the foam forms a strong bond with the interior of shell 12. The jigging technique depends mainly on the scale of production desired and the exact design of the jig to suit the production scale should be apparent to those skilled in the art.

During the period of time that the assembly is in the jig i.e. during the time required for the curing of the foam materials the assembly should be kept well ventilated to dissipate the vapors evolved, thus eliminating harmful effects on operating personnel.

After completion of the cure period which is dependent, as explained earlier, on the type of material used to make the foam, the assembly is removed from the jigging unit 26 and the assembly is ready for the separation of the insulating component 30 or 31 from the mould 15.

The separation step is shown schematically in FIG. 10. Mould 15, which as explained earlier has a series of air passages therein is connected to a source of air pressure by suitable means, such as hose 27, the air pressure acting to dislodge the insulating component from the mould.

Other means may, of course, be used such as a chisel to free the component from the mould, but the air pressure method consumes less time and prevents possible damage to both mould and product. Since the plastic coating originally on the mould adheres much more rigidly to the foam, than to the mould, this coating becomes skin 40 on the component as shown in FIG. 1. Due to the selective coating of the mould (i.e. by masking), the skin 40 does not reach completely to the edge of the interior of shell 12 and instead merges with the foam a short distance (see FIG. 4) all around the inside periphery of the wall of shell 12. This particular coating feature is preferable when making a product of the type shown since a skin which goes right to the edge of the shell is more likely to lift and pull away from the moulded object under rough service conditions. Furthermore, more heat is conducted from the interior of the kit when the skin reaches completely to the edge of the shell, thus reducing thermal efficiency.

When the insulating component 30 or 31 comes off the mould a thin flashing of foam along the shell edge is removed by a metal scraper. The wax release agent applied previously assists in this operation.

The moulding process being completed, the components 30 or 31 is placed in a suitable jig and holes are drilled in the shell 12 into which are fitted special clasps 34. These clasps are used to hold the two insulating components together to form the complete assembly shown in FIG. 1. Suitable carrying means are then fitted to the shell in any suitable manner to complete the kit, which is then assembled along with sealing jars for the compartments 32 and then packed for shipment.

Those skilled in the art will realize that the strength of the kit may be varied by varying the thickness and material used for outer shell 12; varying the plastic skin 40 in thickness (this thickness is generally held at between .005–.015") and by varying the density of the urethane foam mixture.

It should be realized that the process or method described is not limited to the production of the specific article described but is of general applicability to moulded insulating articles which require a hard protective outer surface, an interior surface which is moisture impervious and which conducts a relatively small amount of heat to the outer surface, and a heavy layer of insulating material intermediate said two surfaces.

Various modifications will occur to those skilled in the art. For example, although the preferred embodiment of the process has been described having particular regard to the use of polyurethane as the foam forming material, it will be apparent to those skilled in the art that other foam forming materials may be used provided slight modifications are made to the process. For example when using polystyrene pellets, the mould will be retained at a higher temperature for curing than that used for urethane, since commercially available polystyrene cures at temperatures in the order of 200–350° F. In addition to polyurethane and polystyrene foams the method is also adaptable for use with such wide ranging foams as foams formulated from acrylonitrile-butadiene-styrene, as well as the polyolefins. Thermosetting foams, such as the epoxy foams, are not considered desirable for use in the completed product due to their low insulating properties as compared with the polyurethane foams for example.

A wide range of materials may be used to form the previously described thin skin of plastic on the mould surface. The thermoplastics are preferred over the thermosetting plastics because their inherent flexibility makes for easier release of the completed product from the mould; in addition this inherent flexibility combined with toughness and resistance to breakage make the use of thermoplastics as opposed to the thermosetting plastics desirable as the skin coating material. One of the best thermoplastics for use as the skin coating material is, as previously disclosed, flexible polyvinyl chloride. Examples of other suitable thermoplastics are acrylonitrile-butadiene-styrene, nylon, and ethylene vinyl acetate in finely ground powder; low density polyethylene and chlorinated polyethers are also suitable as coating materials. If thermosetting materials are to be used, a powdered thermosetting epoxy is one example of a suitable material. It should also be possible to use certain of the natural or synthetic rubber materials. However, the use of these materials is not considered desirable since they tend to absorb and retain food odors thus creating a problem in a completed food container of the type described herein.

It should be realized that the above listing of plastics materials which can be used is exemplary only. Those skilled in the art will recognize that many other synthetic plastic skin forming and foam forming materials are useful in the carrying out of the present invention.

Selection of material for the protective outer shell is, of course, governed by cost versus performance characteristics and processability. These three requirements are best met in either the terpolymer acrylonitrile-butadiene-styrene or the polypropylene copolymers modified for cold weather performance. When performance requirements make cost secondary a great many more polymeric materials choices become possible. The above materials can be used with a 20% by weight fiberglass long fiber loading for maximum rigidity requirements consistent with strength. Other glass loaded materials in the 20% proportion which can be used are: polyethylene in high or low density, polystyrene, nylon. Other thermoplastic materials without glass fiber reinforcement which may be used if cost of material is not a primary consideration are: polycarbonates in injection or vacuum moulding grades, polysulfone, polyallomer, polyphenylene oxide and polyvinyl chloride with an acrylic modifier in alloy form or ordinary polyvinyl chloride (PVC). Outer shells can also be made from thermosetting materials such as polyester premix moulding compounds with fiberglass reinforcements and melamine formaldehyde reinforced with either cotton or fiberglass. Urea formaldehyde weather sufficiently well. Glass reinforced phenol formaldehyde materials can also be used. The thermosetting materials however have the drawbacks of brittleness and higher material and processing costs.

Some mention should be made regarding the bond achieved between the body "B" of insulating foam and the plastic skin 40 and between the body "B" and the protective shell 12. Firstly, in regard to the bond between the foam and the plastic skin, experience has shown that for all the materials mentioned with the exception of the polyolefins, no treatment is necessary in order to achieve a good bond. However, the surface of the plastic skin which subsequently comes into contact with the foam may be treated prior to the foaming operation in several different ways if exceptional bond strength is necessary.

Bond strength is increased by use of a solution of Zinc Chromate sprayed or brushed on the plastic skin. The skin surface may be coated with "Bondmaster 24B" manufactured by the Rubber and Asbestos Co. Acid etching of the plastic skin with 10% solution of sulphuric acid, caustic etching with 10% solution of sodium hydroxide or light abrasion of the skin surface with a glass bead abrasive such as supplied by Cataphote Corp. U.S.A. blown on to the surface of the plastic skin by compressed air are all suitable alternatives which may be used to increase bond strength.

When polyolefins are used all the above methods may be used on top of a "flame-treating" of the plastic skin which precedes them or "flame-treating" may be used alone. This is done by simply moving a propane flame in light momentary contact with the surface of the plastic where promotion of adhesion between the skin and the shell is desired.

A further method of adherence promotion when the polyolefins are used is that of corona discharge. In this method a mandrel is shaped to fit the part to be treated, with the mandrel attached to an electrode connected to a source of high level alternating voltage. The mandrel is placed close to the piece to be treated and a voltage is impressed across the gap thus treating the surfaces.

In the same manner, no additional treatment of the inner surface of the shell 12 is required to provide a good bond between the latter and the body of foam except when the polyolefins are used. In the case of the polyolefins, the interior of the shell 12 can be treated in the same fashion as the plastic skin as described above except that with an aluminum shell, corona discharged and flame treatment are not effective.

With the polyolefins such as polyethylene or rubber-modified polypropylene copolymers etc. flame-treating or corona discharge may be used alone or augmented later with the other interior surface treatments mentioned above as well as "Pliobond" by Goodyear Rubber Company which is also excellent in providing for a strong bond of the foam and the plastic skin.

What is claimed is:

1. A moulding processing comprising: selectively coating a mould surface with a thin skin of non-expansible synthetic polymeric material so as to produce coated and uncoated areas on said mould surface, providing a preformed rigid shell structure shaped to provide an enclosure between itself and the coated surface of the mould when the preformed shell is positioned over the coated area of the mould, positioning the shell structure over the coated area of the mould and confining a quantity of uncured foam forming synthetic plastics material within the enclosure formed between the coated area of said mould and said preformed shell structure, the shell structure being positioned relative to said mould such that a peripheral edge of the shell structure contacts the mould along a line of contact which completely surrounds the coated area of the mould, with the line of contact being spaced from said coated area, maintaining said from forming materials at a temperature sufficient to cause expansion and curing thereof and allowing said foam forming materials to expand and fill said enclosure and to come into contact with said thin plastic skin and the interior portion of said shell structure, and retaining the expanded foam material within said enclosure for a period of time sufficient to allow said material to cure and harden and adhere to said thin plastic skin and said preformed shell structure by virtue of said contact, thereby to form an insulating component with said thin plastic skin forming a first surface portion thereof and said preformed shell structure forming substantially all of the remaining surface thereof, and thereafter separating said mould from said insulating component the insulating component produced by the process being characterized in that a band of the cured foam material separates said preformed shell from said plastic skin.

2. A process as claimed in claim 1 in which said quantity of uncured foam forming material is deposited on the coated surface of said mould.

3. A process as claimed in claim 1 in which the shell structure is vented to reduce void formation in the foam forming materials as they cure and harden, at least the interior of said shell being of a material capable of forming a strong bond with the foam produced by said foam forming material.

4. A process as claimed in claim 1 in which said plastic skin is a vinyl resin having a thickness of from 0.005 to about 0.015 inch.

5. A process as claimed in claim 1 in which said foam is of a urethane resin.

6. A process as claimed in claim 5 in which said shell is of polyester glass fiber reinforced construction.

7. A process as claimed in claim 6 in which said mould is treated with a releasing agent prior to coating the same with said thin skin of plastic.

8. A moulding process comprising:

(a) coating a mould surface with a thin skin of a synthetic plastics resin in such a way as to provide coated and uncoated areas on said mould, (b) depositing on the coated surface of said mould a quantity of uncured foam forming synthetic plastics materials, (c) placing a vented rigid shell over said foam forming materials and in contact with the mould with said contact occuring along a line defined by a peripheral edge portion of the shell structure, the latter being positioned relative to the mould such that said peripheral edge portion surrounds the coated area of the mould, with the line of contact of the shell structure with the mould being spaced from the margin of the coated area along its entire length, at least the interior of said shell being of material capable of forming a strong bond with the foam produced by said synthetic plastics foam forming materials, said vented shell and said mould being shaped such that when said vented shell is placed over the foam forming materials, an enclosure is formed between the coated surface of the mould and the shell interior, (d) maintaining the mould at a temperature adequate to produce expansion and curing of the foam forming synthetic plastics materials, (e) permitting said foam forming materials to expand within said enclosure and come into contact with said plastic skin and the interior of said shell, (f) maintaining said shell in contact with the mould for a period of time adequate to permit the foam forming materials to harden and cure and form a strong bond with said shell interior and said plastic skin, thereby to form an insulating component with said thin skin of plastic forming a first surface portion thereof nad said shell forming a major portion of the remaining surface thereof, (g) and thereafter separating said mould from said insulating component.

9. The process of claim 8 wherein said mould is treated with a releasing agent and thereafter heated to approximately 400 degrees F. prior to said step of coating said mould with said skin of plastic.

10. The process of claim 8 wherein said mould is cooled to a temperature of approximately 110 degrees F. after coating with said thin skin of plastic and before depositing the foam forming materials thereon.

11. The process of claim 8 wherein said plastic skin comprises polyvinyl chloride resin, with said foam comprising polyurethane resin, and wherein said shell is of a glass fiber reinforced polyester resin material.

12. A moulding process comprising; coating a mould with a thin skin of flexible synthetic plastic material and thereafter enclosing a quantity of uncured foam forming synthetic plastics material in an enclosure formed between the coated surface of said mould and a rigid preformed shell structure, and allowing said foam forming materials to expand and fill said enclosure and to come into pressurized contact with said thin plastic skin and the interior portion of said shell structure, and thereafter permitting the expanded foam components to cure and harden and form a bond with said thin plastic skin and said preformed shell structure by virtue of said pressure contact, and thereafter separating from the mould the moulded foam material with said thin skin of plastic bonded to one surface of said moulded foam and with said rigid shell structure firmly bonded to subtsantially all of the remaining surface area of the moulded foam material, the process further characterized in that said step of coating the mould with said skin of plastic is carried out so as to produce coated and uncoated areas on said mould and wherein said shell structure is placed in contact with said mould along a peripheral edge of the shell structure such that said peripheral edge completely surrounds the coated area of the mould with the line of contact of said mould with said shell structure spaced from said coated area by a substantially uniform distance along its entire length.

13. The process of claim 12 wherein said thin flexible skin comprises polyvinyl chloride resin, said foam comprises polyurethane, with said shell being of a polyester glass fiber reinforced construction.

14. A process according to claim 1 wherein said thin skin comprises polyvinyl chloride resin, and said foam forming plastics resin comprises polyurethane.

15. A process according to claim 1 wherein said thin skin comprises a material selected from the group consisting of polyvinyl chloride, acrylonitrile - butadiene-styrene, nylon, ethylene vinyl acetate, polyethylene and chlorinated polyethers.

16. A process according to claim 15 wherein said foam forming material comprises a material selected from the group consisting of polyurethane and polystyrene.

17. A process according to claim 15 wherein said foam forming material comprises a material selected from the group consisting of polyurethane, polystyrene and acrylonitrile-butadiene-styrene.

18. A process according to claim 15 wherein said foam forming material comprises a material selected from the group consisting of polyurethane, polystyrene, acrylonitrile-butadiene-styrene, and thermosetting epoxy resins.

References Cited

UNITED STATES PATENTS

| | | | |
|---|---|---|---|
| 2,642,920 | 6/1953 | Simon | 264—45 X |
| 2,802,766 | 8/1957 | Levernz | 264—45 |
| 3,084,973 | 4/1963 | Beckley | 264—45 X |
| 3,112,987 | 12/1963 | Griffiths | 264—45 |
| 3,155,751 | 11/1964 | Morris | 264—45 |
| 3,204,016 | 8/1965 | Sanger | 264—45 |
| 3,258,861 | 7/1966 | Niconchuk | 264—45 X |
| 3,279,936 | 10/1966 | Forestek | 264—338 X |
| 3,405,026 | 10/1968 | Roberts | 264—45 X |

DONALD J. ARNOLD, Primary Examiner

P. A. LEIPOLD, Assistant Examiner

U.S. Cl. X.R.

264—261, 279, 338